UNITED STATES PATENT OFFICE.

JAMES HARRY THORP, OF NEW YORK, N. Y.

IMPROVEMENT IN COMPOUNDS FOR ARTIFICIAL STONE.

Specification forming part of Letters Patent No. 195,056, dated September 11, 1877; application filed August 21, 1877.

*To all whom it may concern:*

Be it known that I, JAMES HARRY THORP, of New York city, in the county and State of New York, have invented an Improved Compound for Artificial Stone; and I hereby declare the following to be a full, clear, and exact description thereof.

My invention relates to the manufacture of artificial stone; and consists in a composition formed of certain ingredients, chemically treated, to produce a hard, crystallized material, which is impervious to water and will withstand the action of frost, thereby particularly adapting it for use as a building material in any climate.

To enable others skilled in the art to understand and use my invention, I will proceed to describe the manner in which I have carried it out.

I place forty quarts of soft water in a suitable vessel, and add thereto one and a quarter pound of soap-stone; one pound of carbonate of magnesia; two pounds of sesquioxide of iron; one and one-half pound of litharge; two and one-half pounds of gypsum, and ten pounds of asphaltum, the latter dissolved in one gallon of alcohol.

These ingredients are next thoroughly incorporated together by stirring. I then mix, while dry, eight parts of clean, silicious sharp sand, or sand and gravel, and one part of cement. After this I dilute three quarts of the chemical liquid or compound above described with thirty gallons of water, and thoroughly mix them together. I then use a sufficient quantity of said last-mentioned diluted mixture to dampen the said mixture of sand and cement, so that it can be tamped in the ordinary manner.

The stone after being made as described should continue to be dampened with water for about six days.

I am thus enabled to produce an artificial stone of great durability and superior hardness.

By my improved process the dampening of the sand and cement with the above-described chemical solution produces a crystallization of the compound, whereby it is solidified to such an extent as to be impervious to water when dry, thereby preventing the entrance of moisture and the consequent injury or destruction of the stone by frost when exposed to low temperatures.

What I claim as my invention, and desire to secure by Letters Patent, is—

1. The herein-described compound, chemically treated, consisting of water, carbonate of magnesia, sesquioxide of iron, litharge, gypsum, and asphaltum, dissolved in alcohol, substantially in the proportions above named, and diluted, as set forth, for the purpose of producing the crystallization of the artificial stone, as specified.

2. An artificial stone composed of sand and cement. moistened with the diluted chemical mixture or compound formed of the ingredients described, substantially as and for the purpose set forth.

Witness my hand this 16th day of August, A. D. 1877.

JAMES HARRY THORP.

In presence of—
   P. E. TESCHEMACHER,
   N. W. STEARNS.